(12) United States Patent
Kariyama et al.

(10) Patent No.: US 9,446,814 B2
(45) Date of Patent: Sep. 20, 2016

(54) BICYCLE BRAKE ARM

(71) Applicant: Shimano Inc., Sakai, Osaka (JP)

(72) Inventors: Osamu Kariyama, Osaka (JP); Daisuke Nago, Osaka (JP); Takefumi Terada, Osaka (JP); Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/688,562

(22) Filed: Apr. 16, 2015

(65) Prior Publication Data

US 2015/0217830 A1    Aug. 6, 2015

Related U.S. Application Data

(62) Division of application No. 13/533,436, filed on Jun. 26, 2012, now abandoned.

(51) Int. Cl.
*B62L 1/14* (2006.01)

(52) U.S. Cl.
CPC ...................................... *B62L 1/14* (2013.01)

(58) Field of Classification Search
CPC ............... B62L 1/06; B62L 1/10; B62L 1/14
See application file for complete search history.

(56) References Cited

U.S. PATENT DOCUMENTS

| | | | |
|---|---|---|---|
| 3,076,683 A | 2/1963 | Hanley | |
| 4,199,199 A | 4/1980 | Granda | |
| 4,809,960 A | 3/1989 | Kakimoto et al. | |
| 5,636,716 A | 6/1997 | Sugimoto et al. | |
| 6,079,522 A | 6/2000 | Valdez | |
| 2012/0222919 A1 | 9/2012 | Nago | |
| 2012/0222920 A1 | 9/2012 | Nago | |
| 2012/0222921 A1 | 9/2012 | Nago | |

FOREIGN PATENT DOCUMENTS

| | | | |
|---|---|---|---|
| CN | 201245220 Y | | 5/2009 |
| CN | 201784773 U | * | 4/2011 |
| CN | 1903652 B | | 12/2011 |
| EP | 1 375 332 B1 | | 12/2005 |
| TW | 311581 U | | 7/1997 |
| TW | M259753 U | | 3/2005 |
| TW | M314159 U | | 6/2007 |

OTHER PUBLICATIONS

ProQuest translation of CN 201784773 U, Xu, Apr. 2011.*

* cited by examiner

*Primary Examiner* — Thomas J Williams
(74) *Attorney, Agent, or Firm* — Global IP Counselors

(57) ABSTRACT

A bicycle brake arm includes a sleeve, a brake arm body, first and second abutments and first and second bearing members. The brake arm body has a mounting portion and is rotatably arranged with respect to the sleeve. The first and second abutments are axially arranged with respect to each other on the sleeve. At least a part of the brake arm body is disposed between the first and second abutments. The first bearing member is disposed axially on a first outside of the mounting portion of the brake arm body. The second bearing member is disposed axially on a second outside of the mounting portion of the brake arm body. The first bearing member is axially disposed between the first and second abutments. One of the first and second bearing members includes a roller bearing and the other of the first and second bearing members includes a dry bearing.

18 Claims, 9 Drawing Sheets

BICYCLE BRAKE ARM

CROSS-REFERENCE RELATED TO APPLICATIONS

This application is a divisional application of U.S. patent application Ser. No. 13/533,436 filed Jun. 26, 2012. The entire disclosure of U.S. patent application Ser. No. 13/533,436 is hereby incorporated herein by reference.

BACKGROUND

1. Field of the Invention

This invention generally relates to a bicycle brake arm. More specifically, the present invention relates to a bicycle brake arm with a bearing member.

2. Background Information

Bicycles are typically provided with at least one brake device for stopping. Currently, a wide variety of bicycle brake devices are available. One of the most popular types of bicycle brake devices is a rim brake. Rim brakes are configured to apply a braking force to the wheel of a bicycle by pinching the rim of the wheel with a pair of brake shoes attached to a pair of brake arms. One well-known example of a rim brake is a caliper brake. Caliper brakes are also available in several configurations. There are mainly three types of caliper brakes: a side pull type, a center pull type and a cantilever type. In the caliper brakes, a pair of brake arms is pivotally coupled to the bicycle frame of the bicycle.

The brake arms of the bicycle brake device have bearing members for smooth rotation of the brake arms relative to the bicycle frame of the bicycle. With the conventional bicycle brake device, bearing play of the bearing members of the brake arms must be adjusted while assembling the brake arms to the bicycle frame of the bicycle. For example, the adjustment of bearing play is accomplished by adjusting the degree of tightness of coupling of the brake arms to the bicycle frame of the bicycle. In this case, the assembling work of the brake arms becomes complicated since the assembling work of the brake arms involves bearing adjustment.

SUMMARY

One object of the present disclosure is to provide a bicycle brake arm that simplifies assembling work of the bicycle brake arm with respect to a bicycle frame.

In accordance with one aspect of the present disclosure, a bicycle brake arm includes a sleeve, a brake arm body, first and second abutments and a first bearing member. The brake arm body has a mounting portion. The brake arm body is rotatably arranged with respect to the sleeve. The first and second abutments are axially arranged with respect to each other on the sleeve. At least a part of the brake arm body is disposed between the first and second abutments. The first bearing member is disposed axially on a first outside of the mounting portion of the brake arm body about the sleeve. The first bearing member is axially disposed between the first and second abutments.

These and other objects, features, aspects and advantages will become apparent to those skilled in the art from the following detailed description, which, taken in conjunction with the annexed drawings, discloses selected embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
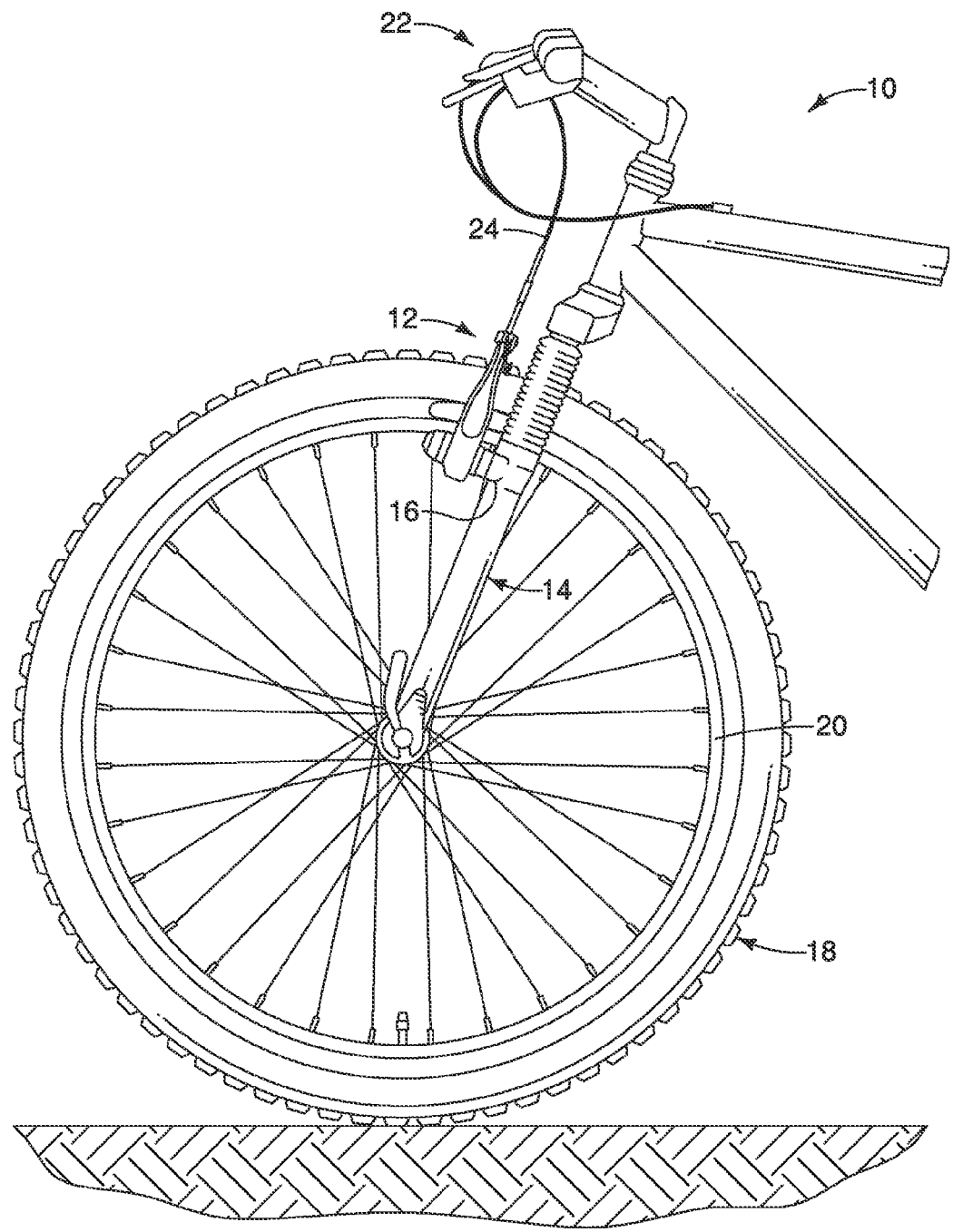
FIG. 1 is a partial side elevational view of a bicycle that is equipped with a bicycle brake device in accordance with a first embodiment.
Figure 2:
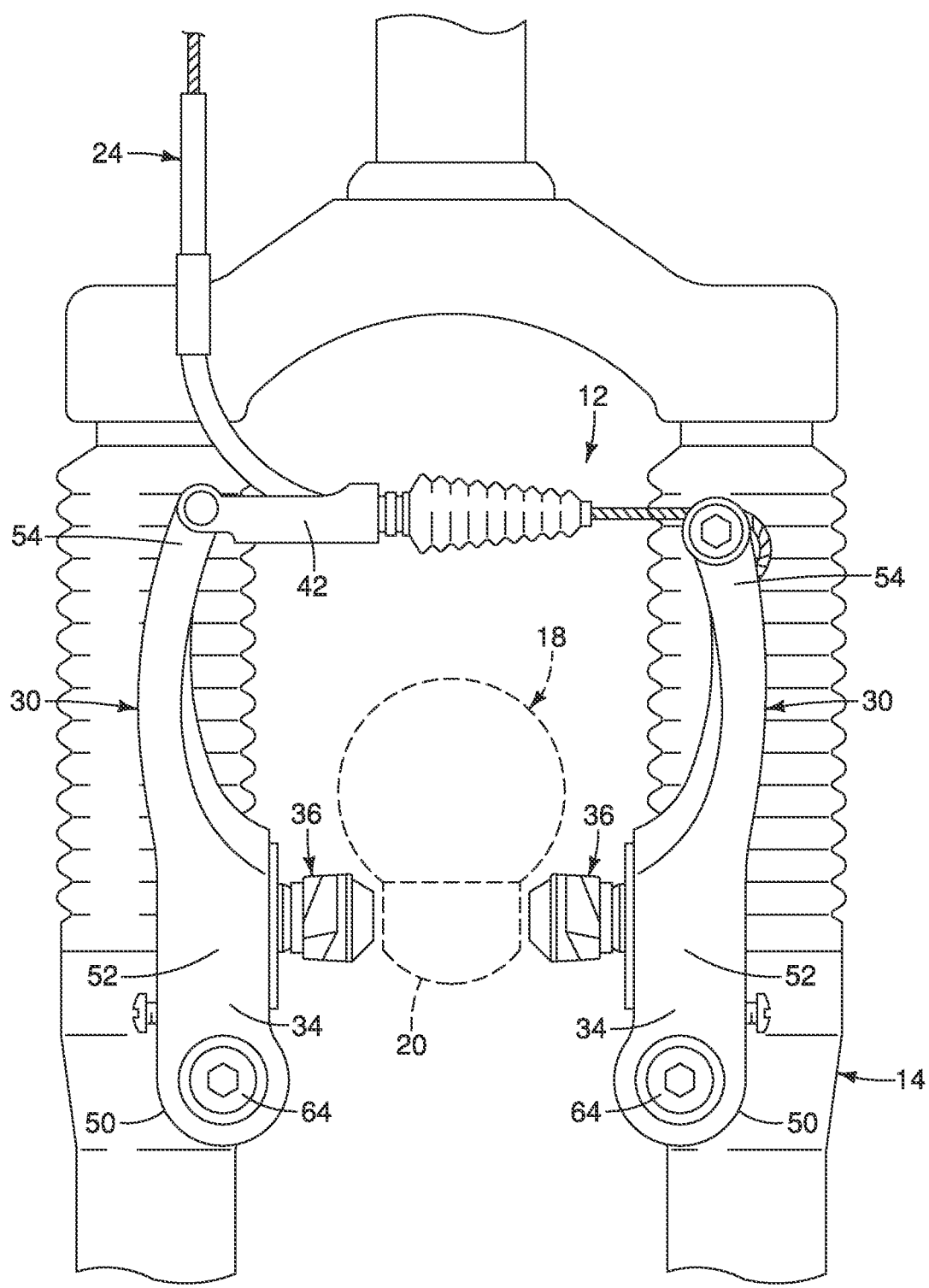
FIG. 2 is a partial front elevational view of a bicycle frame of the bicycle illustrated in FIG. 1 with the bicycle brake device attached to the bicycle frame of the bicycle.
Figure 3:
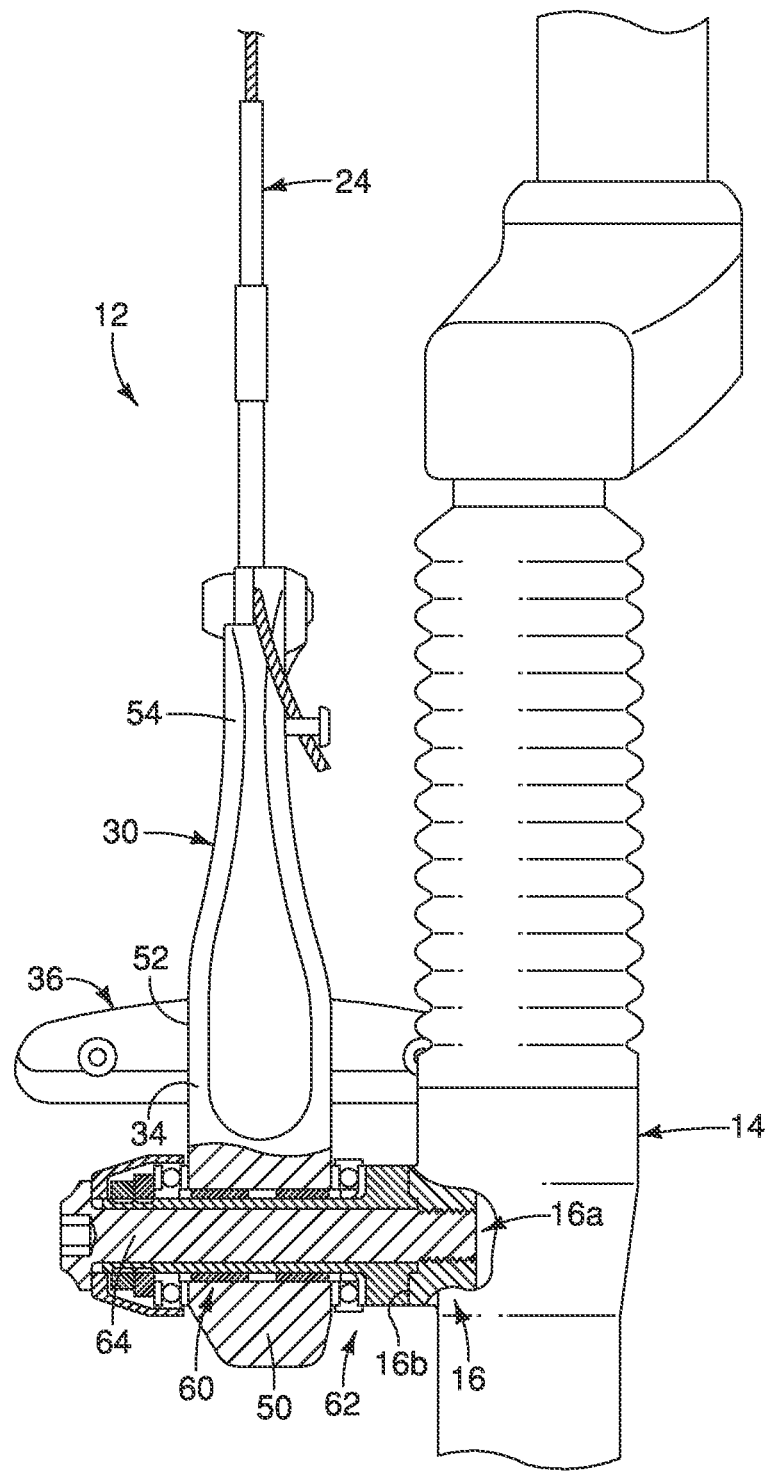
FIG. 3 is a partial side elevational view of the bicycle frame and the bicycle brake device with a portion of a brake arm of the bicycle brake device and a portion of a brake attachment section of the bicycle frame broken away for purpose of illustration.

Referring initially to FIGS. 1 to 3, a front portion of a bicycle 10 is illustrated having a bicycle brake device 12 in accordance with a first embodiment. Bicycles and their various components are well-known in the prior art, and thus, bicycle 10 and its various components will not be discussed or illustrated in detail herein, except for the components of the bicycle 10 which relate to the brake device 12 in accordance with the first embodiment. In other words, only the brake device 12 will be discussed and illustrated in detail herein. Moreover, since most brake devices are well known to those skilled in the art, the brake device 12 will only be discussed and illustrated to the extent needed to understand the present disclosure.

Figure 5:
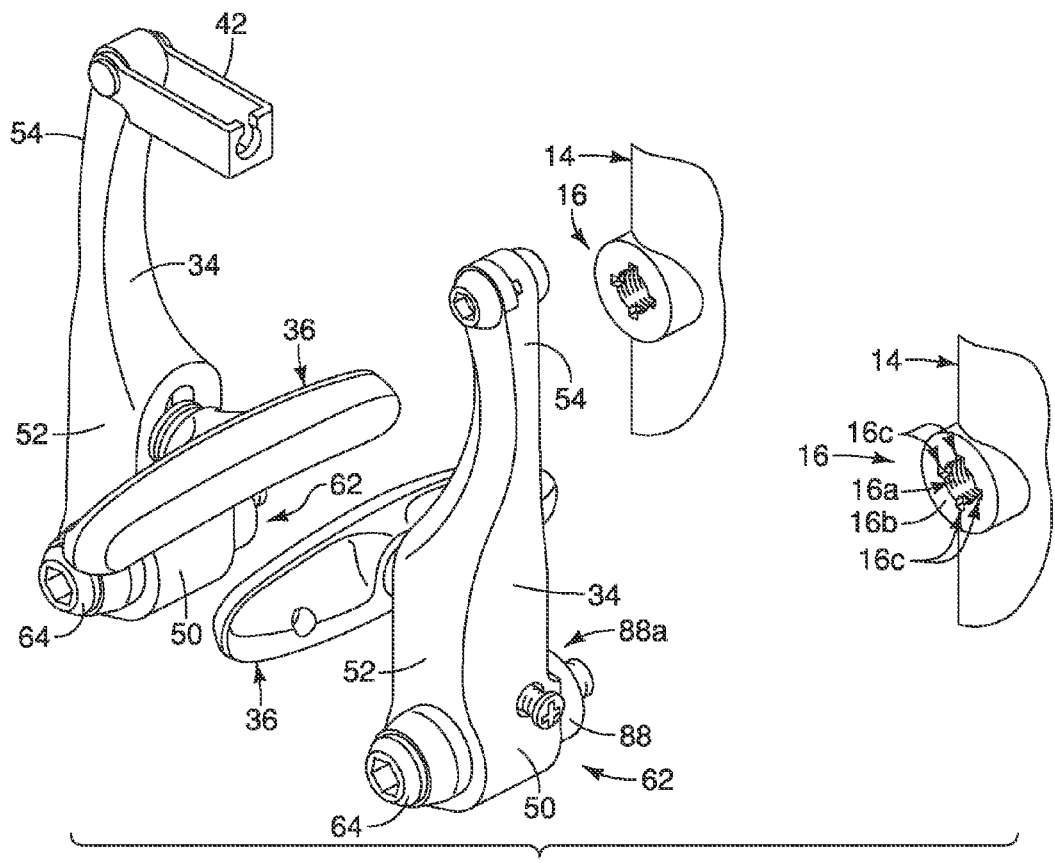
FIG. 5 is a partial perspective view of the bicycle frame of the bicycle illustrated in FIG. 1 illustrating the brake attachment section of the bicycle frame.

As seen in FIG. 1, the brake device 12 is illustrated as being coupled to a front fork 14 (e.g., a bicycle frame) of the bicycle 10. Of course, it will be apparent to those skilled in the art from this disclosure that the brake device 12 can be coupled to the rear fork or another portion of the bicycle 10 as needed and/or desired. As further seen in FIGS. 2, 3 and 5, the brake device 12 is a cantilever type of brake device. Of course, it will also be apparent to those skilled in the art from this disclosure that the present disclosure can be adapted to other types of brake devices.

Basically, the brake device 12 is movably coupled to the front fork 14 of the bicycle 10 such that it can move between a release position and a braking position. The brake device 12 is pivotally coupled on brake attachment sections 16 of the front fork 14 as explained below. In the release position, the brake device 12 does not engage with a rim 20 of a wheel 18 of the bicycle 10 so that the wheel 18 is free to rotate. In the braking position, the brake device 12 is pivoted to grip the rim 20 of the wheel 18 to prevent rotation of the wheel 18. In particular, the rider will operate a brake operating device 22 of the bicycle 10, which in turn will pull a cable 24 to cause the brake device 12 to engage with the rim 20 of the wheel 18 in a conventional manner.

As seen in FIG. 2, the brake device 12 has a pair of brake arms 30 (e.g., bicycle brake arms). The brake arms 30 are pivotally coupled at their lower ends to the front fork 14 and coupled to the cable 24 at their upper ends. Generally, the brake arms 30 are mirror symmetric with respect to each other, except for the manner in which the cable 24 is attach thereto. Each of the brake arms 30 mainly has a brake arm body 34 and a brake shoe 36. The upper ends of the brake arm bodies 34 are interconnected by a connecting link 42 and an end of the cable 24 such that the brake arm bodies 34 pivot together in a conventional manner. The brake arm bodies 34 are cantilevered arms that are pivotally mounted to the front fork 14 of the bicycle 10 for movement between a release position and a braking position. More specifically, each of the brake arm bodies 34 has a lower pivot end or mounting portion 50, a center brake shoe attachment section 52 and an upper cable attachment end 54.

Such cantilever type brakes are described, for example, in U.S. Pat. No. 6,349,799, which is hereby incorporated herein by reference. Thus, for the sake of brevity, the details of the construction of the brake device 12 will be omitted, except for the mounting portion 50. Therefore, the remaining portions of the brake device 12 are only briefly described herein to understand the present disclosure. Furthermore, the brake arms 30 are generally mirror symmetric with respect to each other. Thus, hereinafter, one of the brake arms 30 (e.g., a right brake arm 30) will only be described for the sake of brevity.

As seen in FIG. 3, the mounting portion 50 of the brake arm body 34 of the brake arm 30 has a pivot hole or opening 60 with a brake arm supporting unit 62 rotatably coupled therein. A fixing bolt 64 (e.g., a fixing member) extends through the pivot opening 60 and is threaded into an internal threaded bore 16a (see also FIG. 5) of the brake attachment section 16 of the front fork 14 to pivotally couple the brake arm body 34 to the front fork 14. Furthermore, a biasing member (not shown) is operatively provided between the brake arm body 34 and the front fork 14. Thus, the biasing member normally applies a rotational force about the fixing bolt 64 such that the brake arm body 34 is normally biased outwardly to a release position. The biasing member is well known in the prior art, and therefore, the biasing member will not be discussed or illustrated in detail herein.

Figure 4:
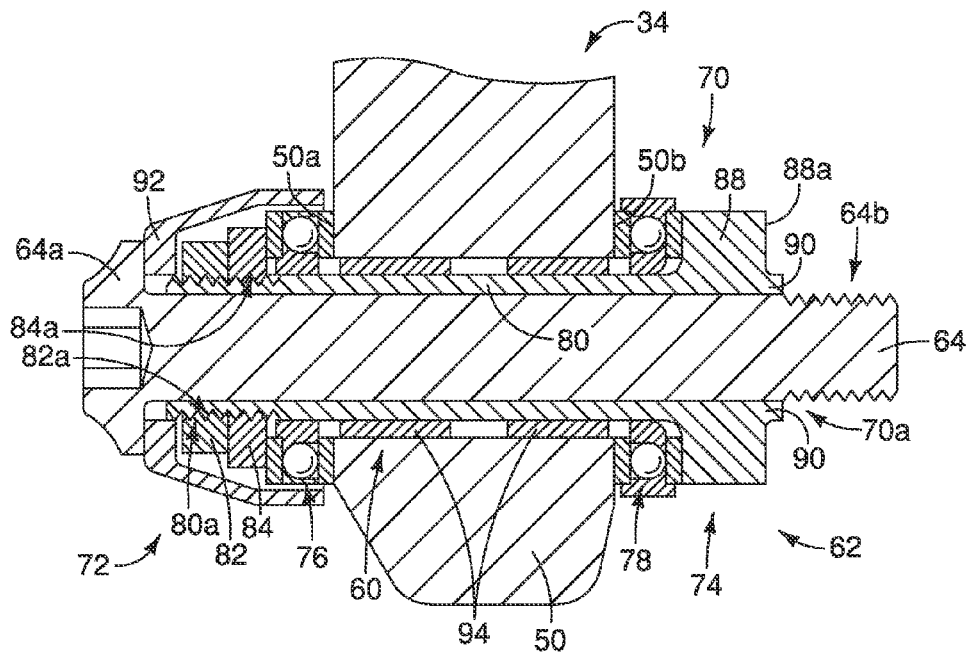
FIG. 4 is an enlarged cross sectional view of the bicycle brake arm of the bicycle brake device illustrated in FIG. 4.

As further seen in FIG. 4, the brake arm supporting unit 62 is rotatably coupled to the mounting portion 50 of the brake arm body 34. The brake arm supporting unit 62 further includes a sleeve 70, first and second abutments 72 and 74, first and second bearing members 76 and 78 that are axially arranged with respect to each other along a center axis of the fixing bolt 64. The mounting portion 50 of the brake arm body 34 is rotatably arranged with respect to the sleeve 70. The sleeve 70 includes a cylindrical sleeve body 80 that extends through the mounting portion 50 of the brake arm body 34. The sleeve 70 is made of metal or any other suitable material.

The first and second abutments 72 and 74 are axially arranged with respect to each other on the sleeve 70. The first abutment 72 is axially disposed farther from the front fork 14 than the second abutment 74. At least a part of the brake arm body 34 is disposed between the first and second abutments 72 and 74. In particular, the mounting portion 50 of the brake arm body 34 is axially disposed between the first and second abutments 72 and 74. The first abutment 72 is axially adjustable with respect to the sleeve body 80 of the sleeve 70. The first abutment 72 includes first and second fixing nuts 82 and 84 (e.g., locking members) that are axially adjustably coupled to the sleeve body 80 of the sleeve 70. The second fixing nut 84 is axially disposed between the first fixing nut 82 and the first bearing member 76 such that the second fixing nut 84 axially contacts with the first fixing nut 82 and the first bearing member 76. The first and second fixing nuts 82 and 84 have internal threaded portions 82a and 84a, respectively. The internal threaded portions 82a and 84a of the first and second fixing nuts 82 and 84 are threaded to an external threaded portion 80a of the sleeve body 80 of the sleeve 70.

The second abutment 74 is fixedly coupled to the sleeve body 80 of the sleeve 70. The second abutment 74 includes a flange section 88. The flange section 88 radially extends from the sleeve body 80 of the sleeve 70. The flange section 88 is integrated with the sleeve body 80 of the sleeve 70. In particular, the flange section 88 is integrally formed with the sleeve body 80 of the sleeve 70 as a one-piece, unitary member. The second abutment 74 further has a plurality of (four in this embodiment) axial protrusions 90 on the flange section 88. The axial protrusions 90 form an engagement portion that is configured to be non-rotatably engaged with the brake attachment section 16 of the front fork 14 while the brake arm 30 is attached to the front fork 14. Specifically, the axial protrusions 90 axially protrude with respect to an attachment face 16b (see FIG. 5) of the brake attachment section 16 of the front fork 14. In particular, the axial protrusions 90 axially protrude with respect to an axial end face 88a of the flange section 88 about an peripheral edge of a bolt through hole 70a of the sleeve 70. The axial protrusions 90 are equidistantly arranged with respect to each other along the peripheral edge of the bolt through hole 70a of the sleeve 70 on the axial end face 88a of the flange section 88. The number of the axial protrusions 90 can be more than or less than four as needed and/or desired for coupling the second abutment 74 to the brake attachment section 16 of the front fork 14. The axial end face 88a of the flange section 88 contacts with the attachment face 16b of the brake attachment section 16 of the front fork 14 while the brake device 12 is mounted to the front fork 14. The axial protrusions 90 are engaged with recesses 16c (see FIG. 5) formed around the internal threaded bore 16a, respectively, such that the sleeve 70 is non-rotatably engaged with the brake attachment section 16 of the front fork 14.

The first and second bearing members 76 and 78 are axially arranged with respect to each other on the sleeve 70. The first bearing member 76 is axially disposed farther from the front fork 14 than the second bearing member 78. The first and second bearing members 76 and 78 are disposed axially outside of the mounting portion 50 of the brake arm body 34 about the sleeve body 80. Specifically, the first bearing member 76 is disposed axially on a first outside (e.g., a front outside) of the mounting portion 50 of the brake arm body 34 about the sleeve 70. In other words, the first bearing member 76 is disposed at an axially non-overlapping location relative to the mounting portion 50. The first bearing member 76 is axially disposed between the first and second abutments 72 and 74. The first bearing member 76 includes a thrust bearing. Specifically, the first bearing member 76 includes a thrust roller bearing. The thrust bearing of the first bearing member 76 can include a conventional construction. Thus, the details of the thrust bearing will be omitted for the sake of brevity. The first bearing member 76 is axially disposed between the first abutment 72 and the mounting portion 50 of the brake arm body 34. In particular, the first bearing member 76 axially contacts with the second fixing nut 84 of the first abutment 72 and a first axial end face 50a of the mounting portion 50 such that the first bearing member 76 supports an axial load between the second fixing nut 84 of the first abutment 72 and the first axial end face 50a of the mounting portion 50. Alternatively or optionally, the first bearing member 76 can include a dry bearing, such as a bush or thrust washer.

Furthermore, the second bearing member 78 is disposed axially on a second outside (e.g., a rear outside) of the mounting portion 50 of the mounting portion 50 of the brake arm body 34 about the sleeve 70. In other words, the second bearing member 78 is disposed at an axially non-overlapping location relative to the mounting portion 50. The second bearing member 78 is axially disposed between the first and second abutments 72 and 74. The second bearing member 78 includes a thrust bearing. Specifically, the second bearing member 78 includes a thrust roller bearing. The thrust bearing of the second bearing member 78 can include a conventional construction. Thus, the details of the thrust bearing will be omitted for the sake of brevity. The second bearing member 78 is axially disposed between the second abutment 74 and the mounting portion 50 of the brake arm body 34. In particular, the second bearing member 78 axially contacts with the flange section 88 of the second abutment 74 and a second axial end face 50b of the mounting portion 50 such that the second bearing member 78 supports an axial load between the flange section 88 of the second abutment 74 and the second axial end face 50b of the mounting portion 50. The second axial end face 50b is an axially opposite face of the first axial end face 50a. Alternatively or optionally, the second bearing member 78 can include a dry bearing, such as a bush or thrust washer.

The brake arm supporting unit 62 is rotatably coupled to the mounting portion 50 of the brake arm 30 as follows. First, the second bearing member 78 is disposed about the sleeve body 80 of the sleeve 70. The sleeve body 80 is inserted into the opening 60 on the mounting portion 50 of the brake arm 30 from the second side of the mounting portion 50 such that the second bearing member 78 is axially sandwiched between the flange section 88 of the sleeve 70 and the mounting portion 50. As seen in FIG. 4, a pair of radial bearings 94, such as DU bushings, is also disposed about the sleeve body 80 radially between the sleeve body 80 and the opening 60 of the mounting portion 50 for smooth rotation of the brake arm 30 with respect to the sleeve 70. Furthermore, the first bearing member 76 is disposed about the sleeve body 80 of the sleeve 70 from the first side of the mounting portion 50 of the brake arm 30. Then, the second fixing nut 84 is threadedly coupled to the threaded portion 80a of the sleeve body 80 such that the first bearing member 76 is axially sandwiched between the second fixing nut 84 and the mounting portion 50 of the brake arm 30. Here, axial position of the second fixing nut 84 is adjusted such that adequate bearing play of the first and second bearing members 76 and 78 for rotatably supporting the mounting portion 50 of the brake arm 30 on the sleeve 70 is achieved. Furthermore, the first fixing nut 82 is threadedly coupled to the threaded portion 80a of the sleeve body 80 to retain the axial position of the second fixing nut 84.

The brake arm 30 with the brake arm supporting unit 62 is assembled to the brake attachment section 16 of the front fork 14 with the fixing bolt 64. The fixing bolt 64 is a threaded fastener or screw. The fixing bolt 64 extends through the sleeve 70 of the brake arm supporting unit 62. Specifically, the fixing bolt 64 extends beyond the axial end face 88a of the flange section 88 of the sleeve 70 towards the front fork 14. A cover member 92 is attached to the first side of the mounting portion 50 such that the first and second fixing nuts 82 and 84 and the first bearing member 76 are disposed within the cover member 92. The fixing bolt 64 has a head portion 64a that is axially disposed outside the cover member 92 to axially press the cover member 92 against the first fixing nut 82. The fixing bolt 64 further has an external threaded section 64b on an opposite end portion of the fixing bolt 64 opposite the head portion 64a. The threaded section 64b is screwed to the internal threaded bore 16a of the brake attachment section 16 of the front fork 14 to fixedly couple the brake arm supporting unit 62 to the brake attachment section 16 of the front fork 14. The bolt through hole 70a of the sleeve 70 is formed as a non-threaded bore. Thus, the fixing bolt 64 can be slidably inserted through the bolt through hole 70a of the sleeve 70, and then threaded into the internal threaded bore 16a of the brake attachment section 16 of the front fork 14.

With this brake device 12, assembling work of the brake arms 30 with respect to the front fork 14 can be simplified. In particular, bearing play of the first and second bearing members 76 and 78 can be adjusted by adjusting the degree of tightness or axial position of the second fixing nut 84. Furthermore, the first fixing nut 82 retains the axial position of the second fixing nut 84, which maintain the bearing play of the first and second bearing members 76 and 78. In other words, each of the brake arms 30 with the brake arm supporting units 62 can be assembled to the front fork 14 as a unit. Specifically, the bearing play of the first and second bearing members 76 and 78 can be adjusted before assembling the brake arms 30 to the front fork 14. Thus, the assembling work of the brake arms 30 can be simplified.

With this brake device 12, the sleeves 70 has the axial protrusions 90 that are engaged with the recesses 16c on the brake attachment sections 16 of the front fork 14. Thus, the sleeves 70 can be easily positioned relative to the brake attachment sections 16 of the front fork 14, respectively, while assembling the brake arms 30 to the front fork 14, which also simplifies the assembling work of the brake arms 30.

In this embodiment illustrated above, the first abutment 72 includes the first and second fixing nuts 82 and 84 that are axially adjustably coupled to the sleeve body 80 of the sleeve 70. However, alternatively, the first abutment 72 can include a flange section that is integrated with the sleeve body 80 of the sleeve 70 and radially extends from the sleeve body 80 of the sleeve 70.

On the other hand, in this embodiment illustrated above, the second abutment 74 includes the flange section 88 that radially extends from the sleeve body 80 of the sleeve 70 and is integrated with the sleeve body 80 of the sleeve 70. However, alternatively, the second abutment 74 can include first and second fixing nuts that are axially adjustably coupled to the sleeve body 80 of the sleeve 70. In this case, the axial protrusions 90 are disposed on an axial end face of one of the first and second fixing nuts.

In this embodiment illustrated above, the brake arm supporting unit 62 has a pair of thrust roller bearings (i.e., the first and second bearing members 76 and 78). However, the brake arm supporting unit 62 can only have one thrust roller bearing. In other words, one of the first and second bearing members 76 and 78 can be removed, or replaced with a dry bearing, such as a bush or thrust washer.

In this embodiment illustrated above, the bolt through hole 70a of the sleeve 70 is formed as a non-threaded bore such that the fixing bolt 64 is slidably inserted through the bolt through hole 70a of the sleeve 70 without rotating the fixing bolt 64. However, the bolt through hole 70a of the sleeve 70 can include an internal threaded portion. In this case, the threaded section 64b of the fixing bolt 64 is threadedly coupled to the internal threaded portion of the bolt through hole 70a of the sleeve 70, and then threaded into the internal threaded bore 16a of the brake attachment section 16 of the front fork 14. Thus, the fixing bolt 64 can be attached to the brake arm supporting unit 62 while shipping the brake device 12. Thus, the brake arm supporting unit 62 with the fixing bolt 64 can be assembled to the front fork 14 as a unit, which also simplifies the assembling work of the brake device 12.

Second Embodiment

Figure 6:
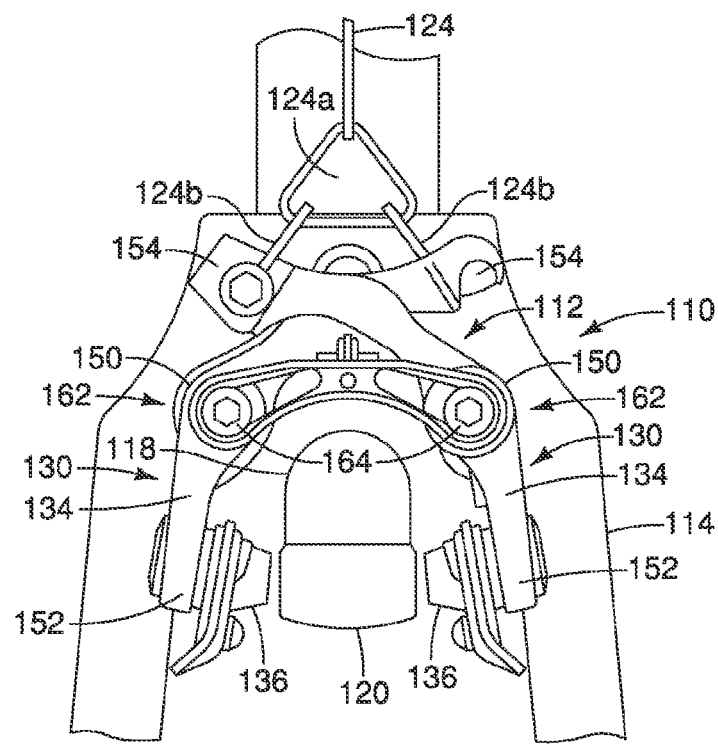
FIG. 6 is a partial front elevational view of a bicycle frame of a bicycle that is equipped with a bicycle brake device in accordance with a second embodiment.
Figure 7:
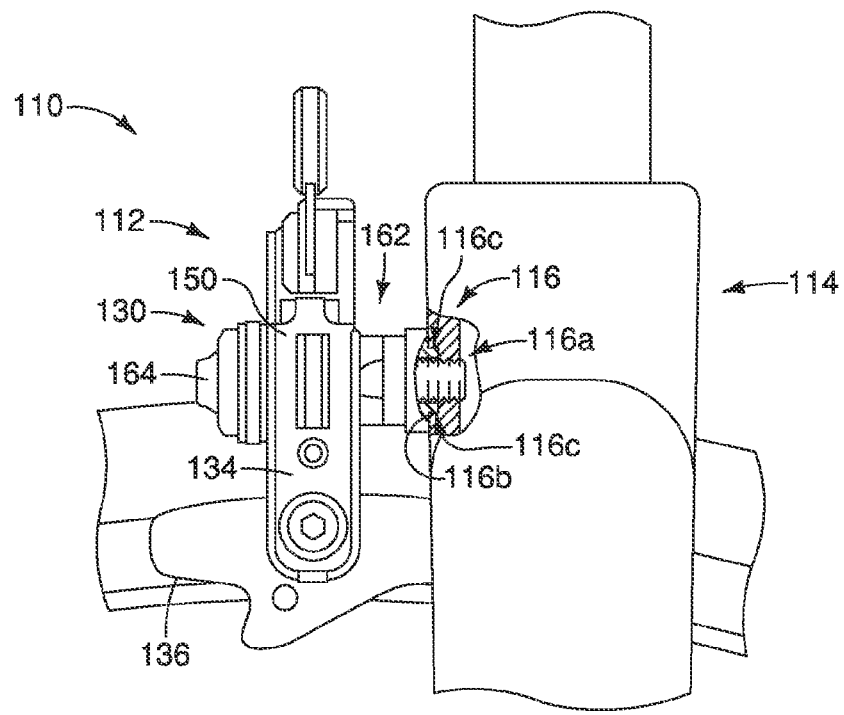
FIG. 7 is a partial side elevational view of the bicycle frame and the bicycle brake device illustrated in FIG. 6, with a portion of a brake attachment section of the bicycle frame device broken away for purpose of illustration.
Figure 8:
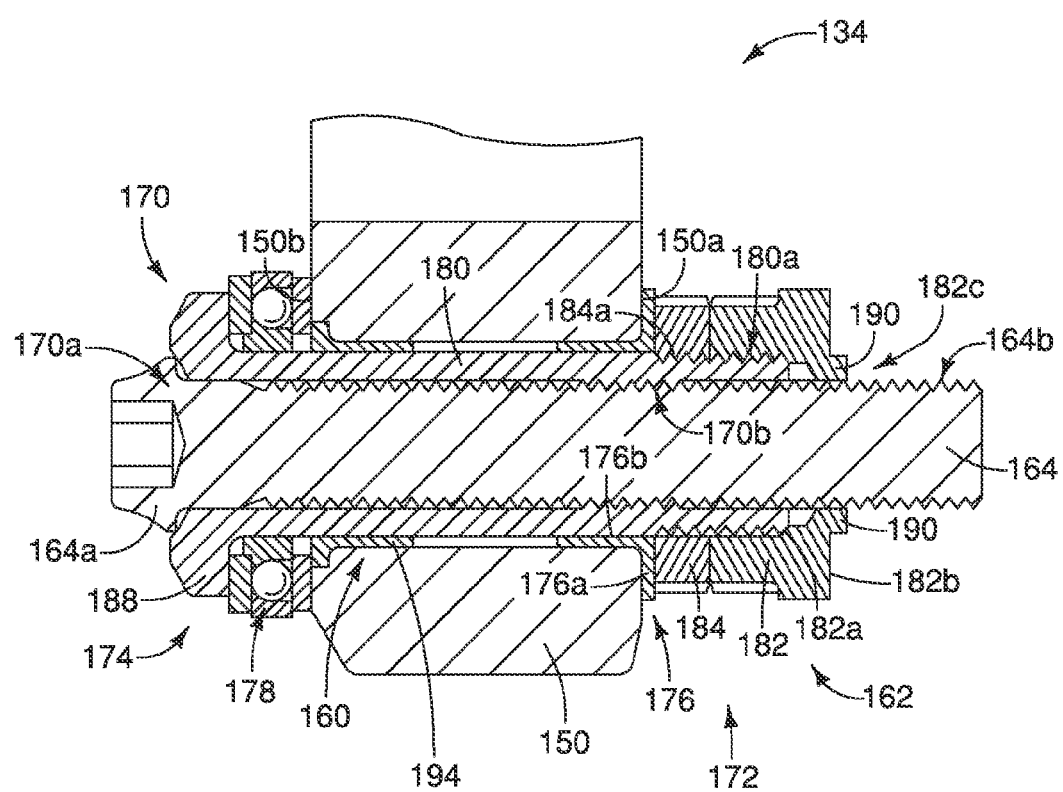
FIG. 8 is an enlarged cross sectional view of a bicycle brake arm of the bicycle brake device illustrated in FIG. 6.

Referring now to FIGS. 6 to 8, a front portion of a bicycle 110 is illustrated having a bicycle brake device 112 in accordance with a second embodiment. Bicycles and their various components are well-known in the prior art, and thus, the bicycle 110 and its various components will not be discussed or illustrated in detail herein, except for the components of the bicycle 110 which relate to the brake device 112 in accordance with the second embodiment. In other words, only the brake device 112 will be discussed and illustrated in detail herein. Moreover, since most brake devices are well known to those skilled in the art, the brake device 112 will only be discussed and illustrated to the extent needed to understand the present disclosure.

As seen in FIG. 6, the brake device 112 is illustrated as being coupled to a front fork 114 (e.g., a bicycle frame) of the bicycle 110. Of course, it will be apparent to those skilled in the art from this disclosure that the brake device 112 can be coupled to the rear fork or another portion of the bicycle 110 as needed and/or desired. As further seen in FIGS. 6 and 7, the brake device 112 is a center pull type of brake device. Of course, it will also be apparent to those skilled in the art from this disclosure that the present disclosure can be adapted to other types of brake devices.

Basically, the brake device 112 is movably coupled to the front fork 114 of the bicycle 110 such that it can move between a release position and a braking position. The brake device 112 is pivotally coupled on brake attachment sections 116 of the front fork 114 as explained below. In the release position, the brake device 112 does not engage with a rim 120 of a wheel 118 of the bicycle 110 so that the wheel 118 is free to rotate. In the braking position, the brake device 112 is pivoted to grip the rim 120 of the wheel 118 to prevent rotation of the wheel 118. In particular, the rider will operate a brake operating device of the bicycle 110, which in turn will pull a cable 124 to cause the brake device 112 to engage with the rim 120 of the wheel 118 in a conventional manner.

As seen in FIGS. 6 and 7, the brake device 112 has a pair of brake arms 130 (e.g., bicycle brake arms). The brake arms 130 are pivotally coupled at their middle portions to the front fork 114, are coupled to the cable 124 at there upper ends. The brake arms 130 have different shape relative to each other. However, each of the brake arms 130 mainly has a brake arm body 134 and a brake shoe 136. The upper ends of the brake arm bodies 134 are connected to the cable 124 via an intermediate control element with a control plate 124a and a pair of intermediate control wires 124b coupled thereto such that the brake arm bodies 134 pivot together in a conventional manner. The brake arm bodies 134 are pivotally mounted to the front fork 114 of the bicycle 110 for movement between a release position and a braking position. More specifically, each of the brake arm bodies 134 generally has a center pivot portion or mounting portion 150, a lower brake shoe attachment section 152 and an upper cable attachment end 154.

Such center pull type brakes are described, for example, in U.S. application Ser. Nos. 13/040,930, 13/041,030, and 13/408,324, which are hereby incorporated herein by reference. Thus, for the sake of brevity, the details of the construction of the brake device 112 will be omitted, except for the mounting portion 150. Therefore, the remaining portions of the brake device 112 are only briefly described herein to understand the present disclosure. Furthermore, the mounting portions 150 of the brake arms 130 are generally mirror symmetric or identical with respect to each other. Thus, hereinafter, the constructions of one of the brake arms 130 (e.g., a right brake arm 130) will only be described for the sake of brevity.

As seen in FIG. 8, the mounting portion 150 of the brake arm body 134 of the brake arm 130 has a pivot hole or opening 160 with a brake arm supporting unit 162 rotatably coupled therein. A fixing bolt 164 (e.g., a fixing member) extends through the pivot opening 160 and is threaded into an internal threaded bore 116a (see FIG. 7) of the brake attachment section 116 of the front fork 114 to pivotally couple the brake arm body 134 to the front fork 114. Furthermore, a biasing member (not shown) is operatively provided between the brake arm body 134 and the front fork 114. Thus, the biasing member normally applies a rotational force such that the brake arm body 134 is normally biased to a release position. The biasing member is well known in the prior art, and therefore, the biasing member will not be discussed or illustrated in detail herein.

As further seen in FIG. 8, the brake arm supporting unit 162 is rotatably coupled to the mounting portion 150 of the brake arm body 134. The brake arm supporting unit 162 further includes a sleeve 170, first and second abutments 172 and 174, first and second bearing members 176 and 178 that are axially arranged with respect to each other along a center axis of the fixing bolt 164. The mounting portion 150 of the brake arm body 134 is rotatably arranged with respect to the sleeve 170. The sleeve 170 includes a cylindrical sleeve body 180 that extends through the mounting portion 150 of the brake arm body 134. The sleeve 170 is made of metal or any other suitable material.

The first and second abutments 172 and 174 are axially arranged with respect to each other on the sleeve 170. The first abutment 172 is axially disposed closer to the front fork 114 than the second abutment 174. At least a part of the brake arm body 134 is disposed between the first and second abutments 172 and 174. In particular, the mounting portion 150 of the brake arm body 134 is axially disposed between the first and second abutments 172 and 174. The first abutment 172 is axially adjustable with respect to the sleeve body 180 of the sleeve 170. The first abutment 172 includes first and second fixing nuts 182 and 184 (e.g., locking members) that are axially adjustably coupled to the sleeve body 180 of the sleeve 170. The second fixing nut 184 is axially disposed between the first fixing nut 182 and the first bearing member 176 such that the second fixing nut 184 axially contacts with the first fixing nut 182 and the first bearing member 176. The first and second fixing nuts 182 and 184 have internal threaded portions 182a and 184a, respectively. The internal threaded portions 182a and 184a of the first and second fixing nuts 182 and 184 are threaded to an external threaded portion 180a of the sleeve body 180 of the sleeve 170.

The second abutment 174 is fixedly coupled to the sleeve body 180 of the sleeve 170. The second abutment 174 includes a flange section 188. The flange section 188 radially extends from the sleeve body 180 of the sleeve 170. The flange section 188 is integrated with the sleeve body 180 of the sleeve 170. In particular, the flange section 188 is integrally formed with the sleeve body 180 of the sleeve 170 as a one-piece, unitary member.

The first abutment 172 further has a plurality of (four in this embodiment) axial protrusions 190 on the first fixing nut 182. The axial protrusions 190 form an engagement portion that is configured to be non-rotatably engaged with the brake attachment section 116 of the front fork 114 while the brake arm 130 is attached to the front fork 114. Specifically, the axial protrusions 190 axially protrude with respect to an attachment face 116b (see FIG. 7) of the brake attachment section 116 of the front fork 114. In particular, the axial protrusions 190 axially protrude with respect to an axial end face 182b of the first fixing nut 182 about an peripheral edge of a bolt through hole 182c of the first fixing nut 182. The axial protrusions 190 are equidistantly arranged with respect to each other along the peripheral edge of the bolt through hole 182c of the first fixing nut 182 on the axial end face 182b of the first fixing nut 182. The number of the axial protrusions 190 can be more than or less than four as needed and/or desired for coupling the first abutment 172 to the brake attachment section 116 of the front fork 114. The axial end face 182b of the first fixing nut 182 contacts with the attachment face 116b of the brake attachment section 116 of the front fork 114 while the brake device 112 is mounted to the front fork 114. The axial protrusions 190 are engaged with recesses 116c (see FIG. 7) formed around the internal threaded bore 116a, respectively, such that the sleeve 170 is non-rotatably engaged with the brake attachment section 116 of the front fork 114.

The first and second bearing members 176 and 178 are axially arranged with respect to each other on the sleeve 170. The first bearing member 176 is axially disposed closer to the front fork 114 than the second bearing member 178. The first and second bearing members 176 and 178 are disposed axially with respect to each other about the sleeve body 180. The first bearing member 176 includes a dry bearing, such as a flanged bush. In particular, the first bearing member 176 has a flange part 176a and a cylindrical part 176b. The flange part 176a extends outwardly with respect to the cylindrical part 176b at an end portion of the cylindrical part 176b. The flange part 176a and the cylindrical part 176b are integrally formed as a one-piece, unitary member. The flange part 176a and the cylindrical part 176b are made of resin, such as plastic, or any other suitable material for the dry bearing, plain bearing or friction bearing. The flange part 176a forms a thrust bearing or thrust washer, while the cylindrical part 176b forms a radial bearing. In particular, the flange part 176a of the first bearing member 176 is disposed axially on a first outside (e.g., a rear side) of the mounting portion 150 of the brake arm body 134 about the sleeve 170. In other words, the flange part 176a of the first bearing member 176 is disposed at an axially non-overlapping location relative to the mounting portion 150. Furthermore, the first bearing member 176 is axially disposed between the first and second abutments 172 and 174. Specifically, the flange part 176a of the first bearing member 176 is axially disposed between the first abutment 172 and the mounting portion 150 of the brake arm body 134. In particular, the flange part 176a of the first bearing member 176 axially contacts with the second fixing nut 184 of the first abutment 172 and a first axial end face 150a of the mounting portion 150 such that the first bearing member 176 supports an axial load between the second fixing nut 184 of the first abutment 172 and the first axial end face 150a of the mounting portion 150. The cylindrical part 176b of the first bearing member 176 is disposed about the sleeve body 180 radially between the sleeve body 180 and the opening 160 of the mounting portion 150 for smooth rotation of the brake arm 130 with respect to the sleeve 170. The cylindrical part 176b of the first bearing member 176 axially extends away from the first abutment 172 with respect to the flange part 176a of the first bearing member 176. Alternatively or optionally, the first bearing member 176 can include a thrust bearing. Specifically, the first bearing member 176 can includes a thrust roller bearing. The thrust bearing of the first bearing member 176 can include a conventional construction. Thus, the details of the thrust bearing will be omitted for the sake of brevity.

Furthermore, the second bearing member 178 is disposed axially on a second outside (e.g., a front side) of the mounting portion 150 of the brake arm body 134 about the sleeve 170. In other words, the second bearing member 178 is disposed at an axially non-overlapping location relative to the mounting portion 150. The second bearing member 178 is axially disposed between the first and second abutments 172 and 174. The second bearing member 178 includes a thrust bearing. Specifically, the second bearing member 178 includes a thrust roller bearing. The thrust bearing of the second bearing member 178 can include a conventional construction. Thus, the details of the thrust bearing will be omitted for the sake of brevity. The second bearing member 178 is axially disposed between the second abutment 174 and the mounting portion 150 of the brake arm body 134. In particular, the second bearing member 178 axially contacts with the flange section 188 of the second abutment 174 and a second axial end face 150b of the mounting portion 150 such that the second bearing member 178 supports an axial load between the flange section 188 of the second abutment 174 and the second axial end face 150b of the mounting portion 150. The second axial end face 150b is an axially opposite face of the first axial end face 150a. Alternatively or optionally, the second bearing member 178 can include a dry bearing, such as a bush or thrust washer.

The brake arm supporting unit 162 is rotatably coupled to the mounting portion 150 of the brake arm 130 as follows. First, the second bearing member 178 is disposed about the sleeve body 180 of the sleeve 170. The sleeve body 180 is inserted into the opening 160 on the mounting portion 150 of the brake arm 130 from the second side of the mounting portion 150 such that the second bearing member 178 is axially sandwiched between the flange section 188 of the sleeve 170 and the mounting portion 150. As seen in FIG. 8, a radial bearing 194, such as a DU bushing, is also disposed about the sleeve body 180 radially between the sleeve body 180 and the opening 160 of the mounting portion 150 for smooth rotation of the brake arm 130 with respect to the sleeve 170. Furthermore, the first bearing member 176 is disposed about the sleeve body 180 of the sleeve 170 from the first side of the mounting portion 150 of the brake arm 130 such that the cylindrical part 176b of the first bearing member 176 is disposed radially between the sleeve body 180 and the opening 160 of the mounting portion 150. Then, the second fixing nut 184 is threadedly coupled to the threaded portion 180a of the sleeve body 180 such that the flange part 176a of the first bearing member 176 is axially sandwiched between the second fixing nut 184 and the mounting portion 150 of the brake arm 130. Here, axial position of the second fixing nut 184 is adjusted such that adequate bearing play of the first and second bearing members 176 and 178 for rotatably supporting the mounting portion 150 of the brake arm 130 on the sleeve 170 is achieved. Furthermore, the first fixing nut 182 is threadedly coupled to the threaded portion 180a of the sleeve body 180 to retain the axial position of the second fixing nut 184.

The brake arm 130 with the brake arm supporting unit 162 is assembled to the brake attachment section 116 of the front fork 114 with the fixing bolt 164. The fixing bolt 164 is a threaded fastener or screw. The fixing bolt 164 extends through the sleeve 170 of the brake arm supporting unit 162. Specifically, the fixing bolt 164 extends beyond the axial end face 182b of the first fixing nut 182 of the first abutment 172 towards the front fork 114. The fixing bolt 164 has a head portion 164a that is axially disposed outside the flange section 188 to axially press the flange section 188 towards the front fork 114 while the brake arm 130 is attached to the front fork 114. The fixing bolt 164 further has an external threaded section 164b along an axial direction of the fixing bolt 164. The threaded section 164b is screwed to an internal threaded portion 170b that is formed on an inner peripheral face of the bolt through hole 170a of the sleeve 170. Furthermore, the threaded section 164b is screwed to the internal threaded bore 116a of the brake attachment section 116 of the front fork 114 to fixedly couple the brake arm supporting unit 162 to the brake attachment section 116 of the front fork 114.

With this brake device 112, assembling work of the brake arms 130 with respect to the front fork 114 can be simplified. In particular, bearing play of the first and second bearing members 176 and 178 can be adjusted by adjusting the degree of tightness or axial position of the second fixing nut 184. Furthermore, the first fixing nut 182 retains the axial position of the second fixing nut 184, which maintain the bearing play of the first and second bearing members 176 and 178. In other words, each of the brake arms 130 with the brake arm supporting units 162 can be assembled to the front fork 114 as a unit. Specifically, the bearing play of the first and second bearing members 176 and 178 can be adjusted before assembling the brake arms 130 to the front fork 114. Thus, the assembling work of the brake arms 130 can be simplified.

With this brake device 112, the first abutment 172 has the axial protrusions 190 that are engaged with the recesses 116c on the brake attachment sections 116 of the front fork 114. Thus, the first abutment 172 can be easily positioned relative to the brake attachment sections 116 of the front fork 114, respectively, while assembling the brake arms 130 to the front fork 114, which also simplifies the assembling work of the brake arms 130.

With this brake device 112, the first abutments 172 with the first and second fixing nuts 182 and 184 are disposed on the rear side of the bicycle 10 with respect to the brake arms 130, respectively. Thus, with this brake device 112, aesthetically-refined brake devices can be provided.

In this embodiment illustrated above, the first abutment 172 includes the first and second fixing nuts 182 and 184 that are axially adjustably coupled to the sleeve body 180 of the sleeve 170. However, alternatively, the first abutment 172 can include a flange section that is integrated with the sleeve body 180 of the sleeve 170 and radially extends from the sleeve body 180 of the sleeve 170. In this case, the axial protrusions 190 are disposed on an axial end face of the flange section.

On the other hand, in this embodiment illustrated above, the second abutment 174 includes the flange section 188 that radially extends from the sleeve body 180 of the sleeve 170 and is integrated with the sleeve body 180 of the sleeve 170. However, alternatively, the second abutment 174 can include first and second fixing nuts that are axially adjustably coupled to the sleeve body 180 of the sleeve 170.

In this embodiment illustrated above, the brake arm supporting unit 162 has a dry bearing (i.e., the first bearing member 176) and a thrust roller bearing (i.e., the second bearing member 178). However, the first bearing member 176 can include the thrust roller bearing instead of the dry bearing. Alternatively or additionally, the second bearing member 178 can include the dry bearing, such as a flanged bush or a thrust washer, instead of the thrust roller bearing. Furthermore, the brake arm supporting unit 162 can only include one bearing. In other words, one of the first and second bearing members 176 and 178 can be removed.

In this embodiment, the flange part 176a and the cylindrical part 176b of the first bearing member 176 are integrally formed as a one-piece, unitary member. However, the flange part 176a and the cylindrical part 176b can be independently formed as separate members.

In this embodiment, the bolt through hole 170a of the sleeve 170 includes the internal threaded portion 170b. The threaded section 164b of the fixing bolt 164 is threadedly coupled to the internal threaded portion 170b of the bolt through hole 170a of the sleeve 170, and then threaded into the internal threaded bore 116a of the brake attachment section 116 of the front fork 114. Thus, the fixing bolt 164 can be attached to the brake arm supporting unit 162 while shipping the brake device 112. Thus, the brake arm supporting unit 162 with the fixing bolt 164 can be assembled to the front fork 114 as a unit, which also simplifies the assembling work of brake device 112. On the other hand, the bolt through hole 170a of the sleeve 170 can be formed as a non-threaded bore without the internal threaded portion 170b. In this case, the fixing bolt 164 is slidably inserted through the bolt through hole 170a of the sleeve 170 without rotating the fixing bolt 164, and then threaded into the internal threaded bore 116a of the brake attachment section 116 of the front fork 114.

Third Embodiment

Figure 9:
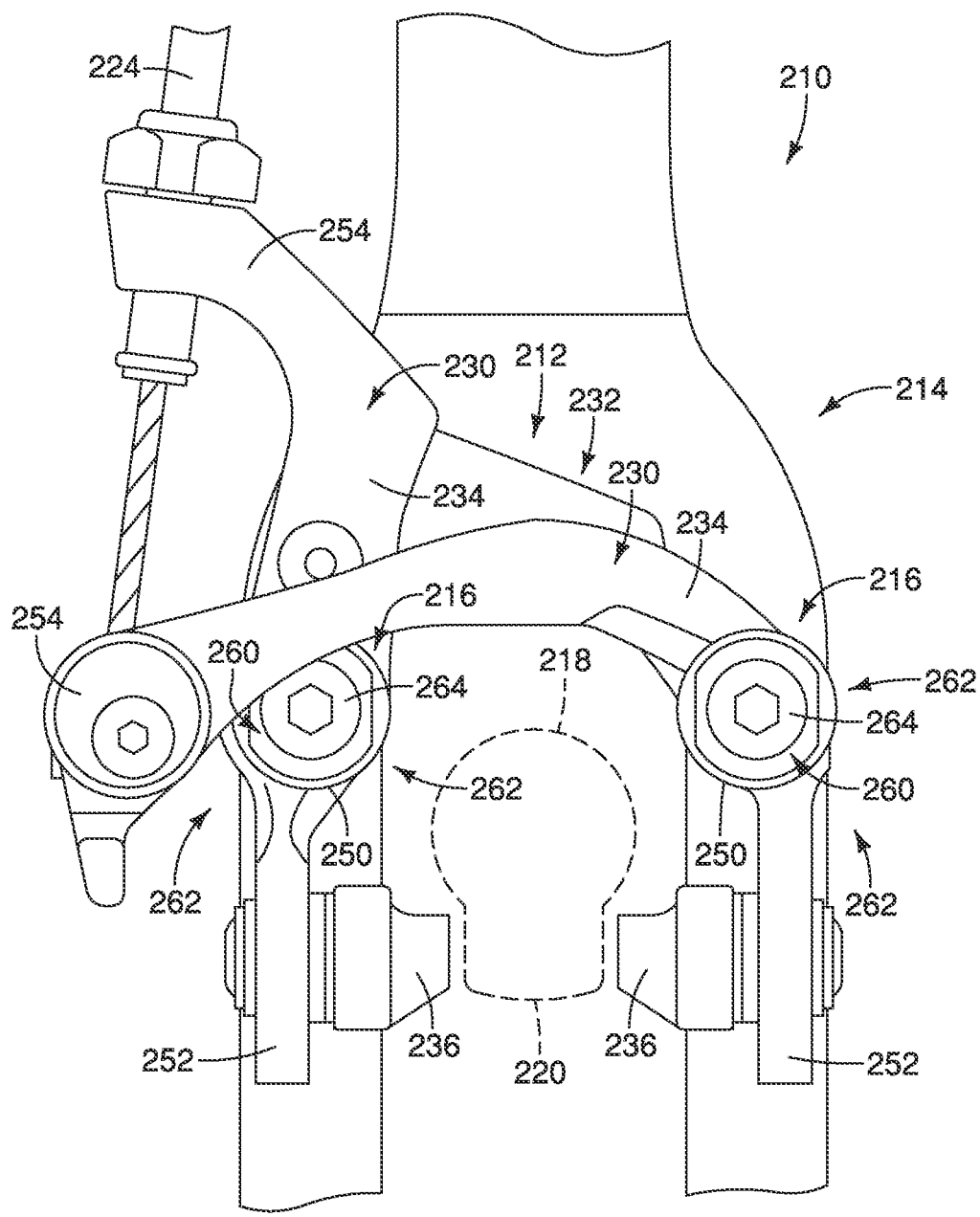
FIG. 9 is a partial front elevational view of a bicycle frame of a bicycle that is equipped with a bicycle brake device in accordance with a third embodiment.
Figure 10:
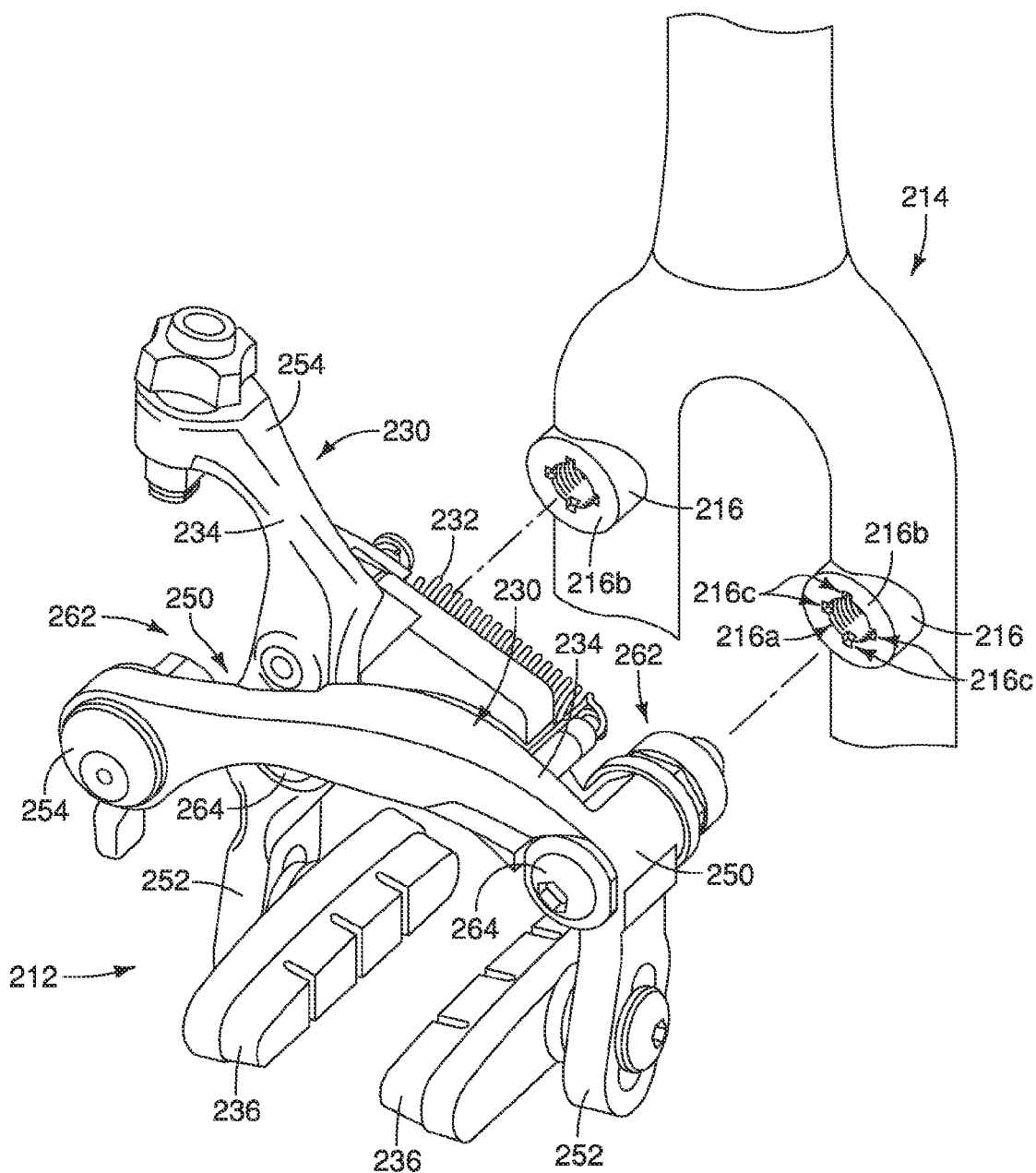
FIG. 10 is a partial perspective view of the bicycle frame of the bicycle illustrated in FIG. 9 illustrating the brake attachment section of the bicycle frame.

Referring now to FIGS. 9 and 10, a front portion of a bicycle 210 is illustrated having a bicycle brake device 212 in accordance with a third embodiment. Bicycles and their various components are well-known in the prior art, and thus, the bicycle 210 and its various components will not be discussed or illustrated in detail herein, except for the components of the bicycle 210 which relate to the brake device 212 in accordance with the third embodiment. In other words, only the brake device 212 will be discussed and illustrated in detail herein. Moreover, since most brake devices are well known to those skilled in the art, the brake device 212 will only be discussed and illustrated to the extent needed to understand the present disclosure.

As seen in FIG. 9, the brake device 212 is illustrated as being coupled to a front fork 214 (e.g., a bicycle frame) of the bicycle 210. Of course, it will be apparent to those skilled in the art from this disclosure that the brake device 212 can be coupled to the rear fork or another portion of the bicycle 210 as needed and/or desired. As further seen in FIGS. 9 and 10, the brake device 212 is a side pull caliper rim brake, and more particularly, a dual-pivot, side pull caliper rim brake.

Basically, the brake device 212 is movably coupled to the front fork 214 of the bicycle 210 such that it can move between a release position and a braking position. The brake device 212 is pivotally coupled on brake attachment sections 216 of the front fork 214 as explained below. In the release position, the brake device 212 does not engage with a rim 220 of a wheel 218 of the bicycle 210 so that the wheel 218 is free to rotate. In the braking position, the brake device 212 is pivoted to grip the rim 220 of the wheel 218 to prevent rotation of the wheel 218. In particular, the rider will operate a brake operating device of the bicycle 210, which in turn will pull a cable 224 to cause the brake device 212 to engage with the rim 220 of the wheel 218 in a conventional manner.

Basically, as seen in FIGS. 9 and 10, the brake device 212 includes first and second brake arms 230 and a biasing member 232. The first and second brake arms 230 are rigid members formed of a suitable material such as a metallic material or a fiber reinforced plastic material. The first and second brake arms 230 are pivotally coupled to the front fork 214. In particular, first and second brake arms 230 include first and second mounting portions 250 that are pivotally mountable to fork blades of the front fork 214, respectively. The first and second mounting portions 250 have brake arm supporting units 262, respectively, that rotatably support the first and second mounting portions 250 relative to fixing bolts 264 (e.g., fixing members) for pivotally mounting the first and second mounting portions 250 of the first and second brake arms 230 to the fork blades of the front fork 214, respectively.

As seen in FIGS. 9 and 10, the brake arms 230 are pivotally coupled at their middle portions to the front fork 214, are coupled to the cable 224 at there distal end portions. The brake arms 230 have different shape relative to each other. However, each of the brake arms 230 mainly has a brake arm body 234 and a brake shoe 236. The distal end portions of the brake arm bodies 234 are connected to the cable 224 such that the brake arm bodies 234 pivot together in a conventional manner. The brake arm bodies 234 are pivotally mounted to the front fork 214 of the bicycle 210 for movement between a release position and a braking position. More specifically, each of the brake arm bodies 234 generally has a center pivot portion or mounting portion 250, a lower brake shoe attachment section 252 and a cable attachment end 254. Furthermore, the biasing member 232 is operatively provided such that the biasing member 232 normally applies a rotational force such that the brake arm bodies 234 are normally biased to a release position. The biasing member 232 is well known in the prior art, and therefore, the biasing member 232 will not be discussed or illustrated in detail herein.

Such caliper rim brakes are described, for example, in U.S. patent application Ser. Nos. 13/040,930, 13/041,030, and 13/408,324, which are hereby incorporated herein by reference. Thus, for the sake of brevity, the details of the construction of the bicycle brake device 212 will be omitted, except for the mounting portions 250. Therefore, the remaining portions of the brake device 212 are only briefly described herein to understand the present disclosure.

As seen in FIGS. 9 and 10, each of the mounting portions 250 of the brake arm bodies 234 of the brake arms 230 has a pivot hole or opening 260 with the brake arm supporting unit 262 rotatably coupled therein. The fixing bolts 264 extend through the pivot openings 260 and are threaded into internal threaded bores 216a (see FIG. 10) of the brake attachment sections 216 of the front fork 214 to pivotally couple the brake arm bodies 234 to the front fork 214. The mounting portions 250 of the brake arms 230 are generally mirror symmetric or identical with respect to each other As further seen in FIG. 10, the brake arm supporting units 262 are rotatably coupled to the mounting portions 250 of the brake arm bodies 234, respectively. Each of the brake arm supporting units 262 includes constructions identical to the brake arm supporting unit 162 illustrated in FIG. 8. Since the details of the brake arm supporting unit 162 are described in the second embodiment of the present disclosure, for the sake of brevity, the details of the constructions of the brake arm supporting units 262 having the same configuration as the brake arm supporting unit 162 will be omitted. Moreover, of course, it will be apparent to those skilled in the art from this disclosure that the modifications of the brake arm supporting unit 162 and the brake device 112 described in the second embodiments can also be adapted to the brake arm supporting units 262 and the brake device 212 in accordance with the third embodiment.

With the brake arm supporting units 262, a plurality of (four in this embodiment) axial protrusions form an engagement portion that is configured to be non-rotatably engaged with the brake attachment sections 216 of the front fork 214 while the brake arms 230 are attached to the front fork 214. Specifically, the axial protrusions axially protrude with respect to attachment faces 216b (see FIG. 10) of the brake attachment sections 216 of the front fork 214 in the same manner as described in the second embodiment. The axial protrusions are engaged with recesses 216c (see FIG. 10) formed around the internal threaded bores 216a, respectively, such that the brake arm supporting units 262 is non-rotatably engaged with the brake attachment sections 216 of the front fork 214.

The brake arms 230 with the brake arm supporting units 262 are assembled to the brake attachment sections 216 of the front fork 214 with the fixing bolts 264 in the same manner as described in the second embodiment. The fixing bolts 264 include a threaded fastener or screw. The fixing bolts 264 extend through the brake arm supporting units 262, respectively. Furthermore, threaded sections of the fixing bolts 264 are screwed to the internal threaded bores 216a of the brake attachment sections 216 of the front fork 214 to fixedly couple the brake arm supporting units 262 to the brake attachment sections 216 of the front fork 214, respectively.

With this brake device 212, the brake arm supporting units 262 include constructions identical to the brake arm supporting unit 162 in accordance with the second embodiment as illustrated in FIG. 8. However, alternatively or optionally, the brake arm supporting units 262 can include constructions identical to the brake arm supporting unit 62 illustrated in FIG. 4. Since the details of the brake arm supporting unit 62 are described in the first embodiment of the present disclosure, for the sake of brevity, the details of the constructions of the brake arm supporting units 262 having the same configuration as the brake arm supporting unit 62 will be omitted. Moreover, of course, it will be apparent to those skilled in the art from this disclosure that the modifications of the brake arm supporting unit 62 and the brake device 12 described in the first embodiments can also be adapted to the brake arm supporting units 262 and the brake device 212 in accordance with the third embodiment.

Figure 11:
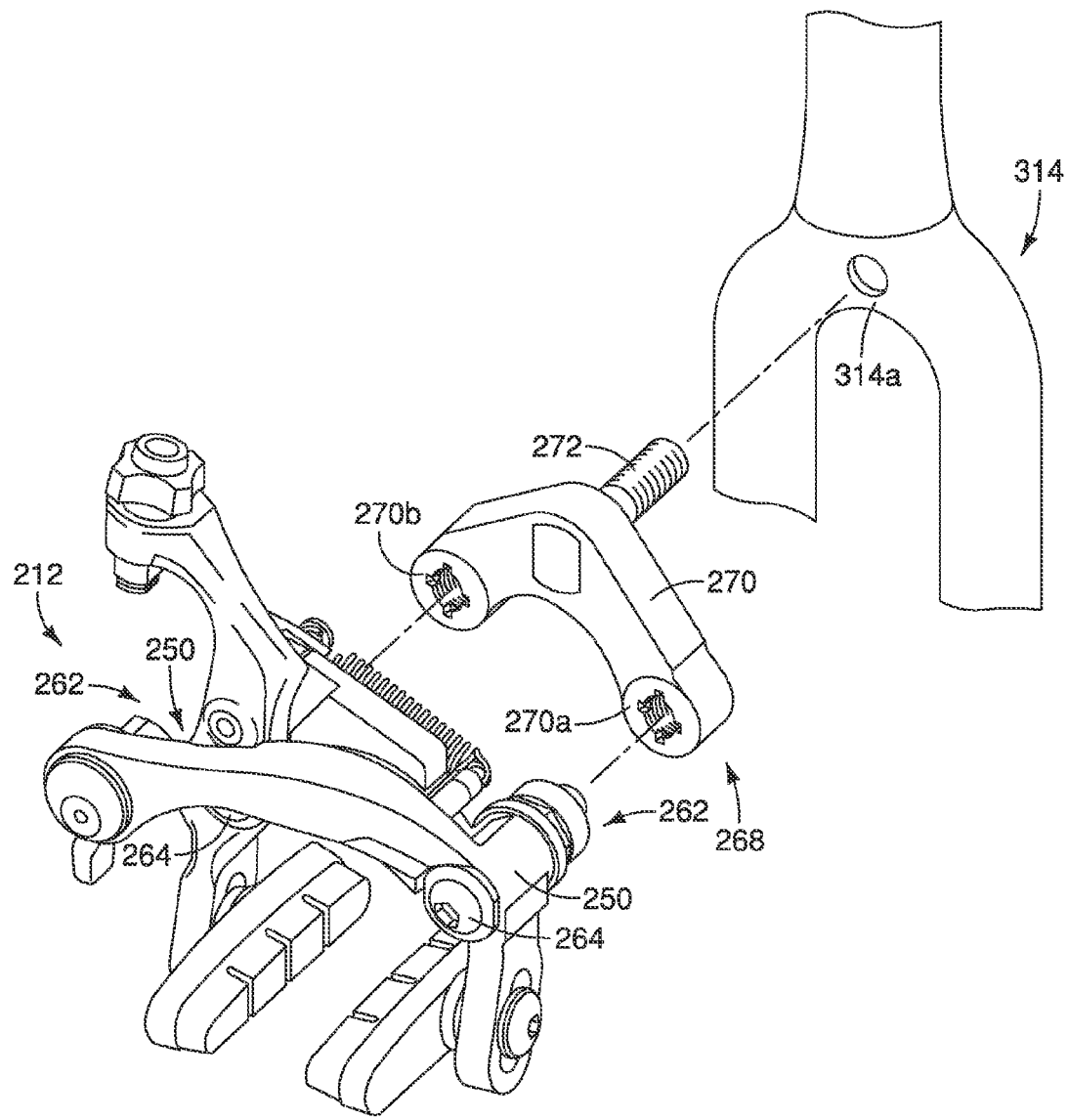
FIG. 11 is a partial perspective view of the bicycle frame of the bicycle illustrated in FIG. 9 illustrating the brake attachment section of the bicycle frame via an adapter.

In this embodiment shown in FIGS. 9 and 10, the brake device 212 is directly mounted to the front fork 214 with the fixing bolts 264. On the other hand, as seen in FIG. 11, the brake device 212 can be mounted to a front fork via an adapter 268. The adapter 268 is mountable to an existing frame or to a new frame when there is only one mounting hole, such as a centrally-disposed mounting hole used for mounting some types of side-pull brakes.

As illustrated in FIG. 11, the adapter 268 has an adapter body 270 with brake attachment portions 270a and 270b, and a mounting bolt 272. The brake arms with the brake arm supporting units 262 are directly assembled to the brake attachment portions 270a and 270b of the adapter 268 with the fixing bolts 264. Each of the brake attachment portions 270a and 270b has a similar construction to the brake attachment sections 216 of the front fork 214 in FIG. 10. Specifically, each of the brake attachment portions 270a and 270b has an internal threaded bore, an attachment face and a plurality of (four in FIG. 11) recesses. Since the brake attachment portions 270a and 270b have similar or identical constructions to the brake attachment sections 216, the details of constructions of the brake attachment portions 270a and 270b will be omitted.

The fixing bolts 264 of the brake device 212 extend through the mounting portions 250, and then directly threaded to threaded portions formed on the brake attachment portions 270a and 270b of the adapter 268. The mounting bolt 272 extends through a mounting hole formed on a brake supporting portion 314a of a front fork 314, and then is screwed to a fixing nut to fixedly couple the adapter 268 to the front fork 314. This forms a single attachment structure between the bicycle brake device 212 and the front fork 314.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise specified.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle brake arm comprising:
  a sleeve;
  a brake arm body having a mounting portion, the brake arm body being rotatably arranged with respect to the sleeve;
  first and second abutments axially arranged with respect to each other on the sleeve, at east a part of the brake arm body being disposed between the first and second abutments;
  a first bearing member disposed axially on a first outside of the mounting portion of the brake arm body about the sleeve; and
  a second bearing member disposed axially on a second outside of the mounting portion,
  one of the first and second bearing members including a roller bearing and the other of the first and second bearing members including a dry bearing that includes a bush, the first and second bearing members being axially disposed between the first and second abutments.

2. The bicycle brake arm according to claim 1, wherein at least one of the first and second abutments is axially adjustable with respect to the sleeve.

3. The bicycle brake arm according to claim 2, wherein the at least one of the first and second abutments further includes first and second locking members that are axially adjustably coupled to the sleeve.

4. The bicycle brake arm according to claim 2, wherein the other of the first and second bearing members is disposed between the brake arm body and the at least one of the first and second abutments.

5. The bicycle brake arm according to claim 1, wherein one of the first and second abutments is formed as one-piece with the sleeve, and the other of the first and second abutments is axially adjustable with respect to the sleeve.

6. The bicycle brake arm according to the claim 5, wherein
  the other of the first and second abutments includes a first fixing nut and a second fixing nut.

7. The bicycle brake arm according to claim 6, wherein
  the roller bearing is disposed between the one of the first and second abutments,
  the dry bearing is disposed between the brake arm body and the first and second fixing nuts of the other of the first and second abutments.

8. The bicycle brake arm according to claim 1, further including a fixing member inserted through the sleeve.

9. The bicycle brake arm according to claim 1, wherein
  the sleeve includes a flange section as one of the first and second abutments, the flange section being disposed at one axial end of the sleeve,
  the one of the first and second bearing members is disposed between the flange and the brake arm body.

10. The bicycle brake arm according to claim 8, wherein the fixing member includes a threaded section that is screwed to a threaded portion of the sleeve.

11. The bicycle brake arm according to claim 10, wherein the fixing member includes a threaded section that is configured to be screwed to a brake attachment section of a bicycle frame while the bicycle brake arm is attached to the bicycle frame.

12. The bicycle brake arm according to claim 11, wherein the fixing member extends beyond an axial end face of one of the first and second abutments.

13. A bicycle brake arm comprising:
  a sleeve
  a brake arm body having a mounting portion the brake arm body being rotatably arranged with respect to the sleeve;
  first and second abutments axially arranged with respect to each other on the sleeve, at least a part of the brake arm body being disposed between the first and second abutments;
  a first bearing member disposed axially on a first outside of the mounting portion of the brake arm body about the sleeve;
  a second bearing member disposed axially on a second outside of the mounting portion; and
  a fixing member inserted through the sleeve, one of the first and second bearing members including a roller bearing and the other of the first and second bearing members including a dry bearing the first and second bearing members being axially disposed between the first and second abutments, the sleeve including a flange section disposed at one axial end of the sleeve, the fixing member being a bolt having a head portion and a threaded portion, the head portion being disposed on an axial outside of the flange section, the threaded portion protruding axially beyond the other axial end of the sleeve.

14. A bicycle brake arm comprising:

a sleeve;

a brake arm body having a mounting portion, the brake arm body being rotatably arranged with respect to the sleeve;

first and second abutments axially with respect to each other on the sleeve, at least a part of the brake arm body being disposed between the first and second abutments;

a first bearing member disposed axially on a first outside of the mounting portion of the brake arm body about the sleeve; and a second bearing member disposed axially on a second outside of the mounting portion, one of the first and second bearing members including a roller bearing and the other of the first and second bearing members including a dry bearing, the first and second bearing members being axially disposed between the first and second abutments, the sleeve including a flange section as one of the first and second abutments and an externally threaded portion, the flange section being disposed at one axial end of the sleeve and the externally threaded portion being disposed at the other axial end of the sleeve, the one of the first and second bearing embers being disposed between the flange and the brake arm body, the other of the first and second abutments including a first fixing nut and a second fixing nut configured to be threaded onto the externally threaded portion of the sleeve.

15. The bicycle brake arm according to claim 14, wherein the other of the first and second bearing members is disposed between the brake arm body and the first and second fixing nuts.

16. A bicycle brake arm comprising:

a sleeve;

a brake arm having mounting portion, the brake arm body being rotatably arranged with respect to the sleeve;

first and second abutments axially arranged with respect to each other on the sleeve, at least a part of the brake arm body being disposed between the first and second abutments, one of the first and second abutments further including an engagement portion that is configured to be non-rotatably engaged with a brake attachment section of a bicycle frame while the bicycle brake arm is attached to the bicycle frame;

a first bearing member disposed axially on a first outside of the mounting portion of the brake arm body about the sleeve; and a second bearing member disposed axially on a second outside of the mounting portion, one of the first and second bearing members including a roller bearing and the other of the first and second bearing members including a dry bearing, the first and second bearing members being axially disposed between the first and second abutments.

17. The bicycle brake arm according to claim 16, wherein the engagement portion further includes an axial protrusion that axially protrudes with respect to the brake attachment section of the bicycle frame.

18. A bicycle brake arm comprising:

a sleeve;

a brake arm body having a mounting portion, the brake arm being rotatably arranged with respect to the sleeve;

first and second abutments axially arranged with respect to each other on the sleeve, at least a part of the brake arm body being disposed between the first and second abutments;

a first bearing member disposed axially on a first outside of the mounting portion of the brake arm body about the sleeve;

a second bearing member disposed axially on a second outside of the mounting portion; and a radial bearing disposed radially between the sleeve and the brake arm body, and axially between the first and second bearing members, one of the first and second bearing members including a roller bearing and the other of the first and second bearing members including a dry bearing, the first and second bearing members being axially disposed between the first and second abutments.

* * * * *